United States Patent [19]
Kline et al.

[11] Patent Number: 5,207,956
[45] Date of Patent: May 4, 1993

[54] COMPUTER-CONTROLLED METHOD FOR COMPOSITE CURING

[75] Inventors: Ronald A. Kline; M. Cengiz Altan, both of Norman, Okla.

[73] Assignee: The Board of Regents of The University of Oklahoma, Norman, Okla.

[21] Appl. No.: 831,608

[22] Filed: Feb. 5, 1992

[51] Int. Cl.$^5$ ............................................. B29C 35/02
[52] U.S. Cl. ................................... 264/40.6; 264/236; 425/143
[58] Field of Search ...................... 264/40.1, 40.6, 236, 264/347, 66; 425/143, 144, 149, 29, 30, 160, 135; 364/473, 476

[56] References Cited

U.S. PATENT DOCUMENTS

| | | | |
|---|---|---|---|
| 4,455,268 | 6/1984 | Hinrichs | 264/23 |
| 4,515,545 | 5/1985 | Hinrichs | 425/143 |
| 4,551,807 | 11/1985 | Hsich et al. | 264/40.1 |
| 4,559,810 | 12/1985 | Hinrichs | 73/54 |
| 4,806,292 | 2/1989 | DeLacy | 264/40.1 |
| 4,810,438 | 3/1989 | Webster et al. | 264/40.1 |
| 4,819,177 | 4/1989 | Jurgensen | 264/40.1 |
| 5,031,457 | 7/1991 | Kline | 73/597 |

OTHER PUBLICATIONS

Loos & Springer, "Curing of Epoxy Matrix Composites", J. of Composite Materials, 17:135-169 (1983).
Hsiao & Kline, "The Measurement of Viscoelastic Moduli Using An Ultrasonic Spectroscopy Technique", 1984 Ultrasonics Symposium, pp. 443-446 (1984).
Kline, "Measurement of Attenuation and Dispersion Using an Ultrasonic Spectroscopy Technique", J. Acoust. Soc., Am., 76(2):498-504 (1984).
Kline, Madaras, & Boltz, "Nondestructive Characterization of Elastic Anisotrophy in Carbon-Composites", Nondestructive Evaluation: NDE Planning and Application. A Symposium of the Am. Soc. of Mech Engr., pp. 135-140 (1989).
Springer, "Resin Flow During the Cure of Fiber Reinforced Composites", J. Composite Materials, 16:400-410 (1982).
Lee, Loos & Springer, "Heat of Reaction, Degree of Cure, and Viscosity of Hercules 3501-6 Resin", J. Composite Materials, 16:510-520 (1982).
Gutowski, "A Resin Flow/Fiber Deformation Model for Composites", SAMPE Quarterly, 16(4):58-64 (1985).
Dave, Kardos, & Dudukovic, "A Model for Resin Flow During Composite Processing: Part 1-General Mathematical Development", Polymer Composites, 8(1):29-38 (1987).
Dave, Kardos, & Dudukovic, "A Model for Resin Flow During Composite Processing Part 2: Numerical Analysis for Unidirectional Graphite/Epoxy Laminates", Polymer Composites, 8(2)123-132 (1987).
Kline & Chen, "Ultrasonic Technique for Global Anisotropic Property Measurement in Composite Materials", Materials Evaluation-46, pp. 986-992 (1988).
Kline, "Wave Propagation in Fiber Reinforced Composites for Oblique Incidence", J. of Composite Materials, 22: pp. 287-302, (Mar. 1988).
Kline & Kulathu, "On-Line Monitoring of Composite Prepreg Fabrication", Presented at the Winter Annual Meeting of the Am. Soc. of Mech. Engr., Atlanta, GA (Dec. 1991).
Kline, "Ultrasonic Characterization of Composite Microstructure", Unpublished.

Primary Examiner—Jill L. Heitbrink
Attorney, Agent, or Firm—Dunlap Codding Lee

[57] ABSTRACT

The present invention comprises a method for controlling the curing process of a composite material part in a curing vessel such as an autoclave. The method relies on the comparison of actual part parameter values to predicted part parameter values wherein the predicted values are obtained from computer simulations of the cure cycles using thermo-chemical, cure kinetics, resin flow and viscosity analytic models. The invention provides a methodology for the continuous selection and updating during the cure process of new optimal cure cycles from sets of cure cycles in response to actual material behavior during the curing process.

18 Claims, 11 Drawing Sheets

COMPUTER-CONTROLLED METHOD FOR COMPOSITE CURING

BACKGROUND OF THE INVENTION

1. Field of the Invention

The present invention relates to the process of controlling the curing of composite materials and, more particularly but not by way of limitation, to the computer controlled selection of cure cycles during the curing process of composite materials in a curing vessel such as an autoclave.

2. Discussion of the Related Art

In recent years there has been dramatic growth in the utilization of polymers for a wide variety of applications. As with any material, one must consider carefully the issues of processing and quality assurance for the fabricated component. While a great deal of experience has been developed for metallic parts, there is much less information available for composite laminates (wherein the term "composite" refers to any thermosetting material constructed of at least two constituent materials). Of particular concern is the complexity of the fabrication process and susceptibility of these structures to both the same types of bulk defects that are seen in conventional materials (such as voids, porosity, and inclusions) as well as an array of more subtle defects (such as overcure/undercure, moisture degradation, weakly bonded interfaces and delamination) unique to composites. Accordingly, new techniques must be available to insure reliability. As performance is dependent upon processing conditions, considerable benefits will result from a method integrating nondestructive evaluation (NDE) into the manufacturing phase.

One example of a composite is graphite/epoxy laminate. Graphite/epoxy is the most commonly used material system and the preparation of vacuum bag layup and application of autoclave cure cycle follows fairly well-established procedures. Nonetheless, the design of a cure cycle is still generally performed in an ad hoc fashion after numerous trials Currently, neither rigorous cure models nor real time nondestructive tests are utilized to any great extent in the composites industry. The nondestructive testing of a part after the fabrication is used today as the principal means of quality assurance. Hence, the ability to analyze the fabrication of graphite/epoxy systems with real time interactive NDE in conjunction with fundamental cure models would be a significant contribution to the existing science of composite manufacturing.

Nondestructive (particularly ultrasonic) test methods offer a powerful means for characterizing material microstructure. Historically, the use of these techniques has been basically confined to gross defect identification based on the large impedance (hence acoustic reflections) differences between flawed and unflawed materials. For metals, this approach has been acceptable because structurally critical flaws (cracks, voids, inclusion) are readily detected with this approach. Composites, while subject to many of the same gross flaws as metals, are susceptible to other significant flaws as well. Because composites are an engineered microstructure, defects in composites are often significantly more subtle than the gross defects described above and are virtually undetectable with conventional approaches Typically, these defects are in the number, type, distribution and efficiency of the microconstituents of the composite. Unfortunately, the bulk of composite NDE today is performed using the amplitude based techniques adapted from metals testing and which are totally inappropriate for finding these critical defects.

Most of the quality control/NDE test procedures currently being used evolve from previous experience in the metals and plastic industries. Most companies divide their activities into quality assurance and nondestructive testing with the bulk of the quality assurance activity devoted to qualifying incoming material to insure that it meets established standards and NDT (Non-Destructive Testing) for defect identification. However, the bulk of the tests being performed suffer from one or more of several important drawbacks:

They are destructive.

Only a limited number of samples are tested.

They are insensitive to certain critical changes in microstructure.

They are performed after fabrication where little or nothing can be done to salvage a flawed component.

Considerable benefits will accrue from a thorough integration of advanced nondestructive measurement science techniques into the production process. Potential benefits are available in the following areas:

Reduced Risk. In a typical aerospace operation, it is not unusual for a batch of composite material to cost in excess of fifty thousand dollars. A critical failure in the process may cause the entire batch to be scrapped.

Reduced Process Time and Processing Steps. One of the optimization factors driving the control process is to minimize the time required to process the part. The process time can be reduced by up to one half the original time in some cases. Because of the uncertainty in the cure status of materials, several steps are often added to the process to assure, for example, that gases have been removed prior to heating the resin above its cure initiation temperature. Some of these steps could be combined if the cure status were known.

Improved Process Capability. The ability to process materials here-to-for considered too difficult to manage, opens a number of options to the designer. If it is possible to build a part which previously could not be built due to the technological limitations, there is significant economic potential both for a new product and for the development of a competitive edge.

Improvement in Quality. The ability to sense and predict the cure status of the resin allows the manufacturer to constantly adjust the process for optimum part quality. With previous technologies, the composite producer has had only limited mean to determine and moderate the cure or consolidation status of the part.

While composites continue to grow in their importance in virtually every facet of the aerospace industry, the bulk of the research activity has been devoted to the development of improved fiber and matrix systems (materials science) and understanding the mechanics of anisotropic, laminated structures (mechanics). However, the research in the processing area, where both materials and mechanics expertise are required, has been limited. While there has been some success in process modeling, little use has been made of this information to date in developing interactive process control systems for composite manufacture. Most current approaches rely upon empirical relations among the pertinent variables (temperature, pressure, degree of cure, viscosity) rather than a unified model of material behavior based on fluid/solid mechanics and heat transfer principles. However, these techniques are limited to the comparison of real time cure characteristics to a preset cure cycle profile which does not change during the curing process (see U.S. Pat. Nos. 4,455,268, 4,515,545, and 4,559,810 issued to Hinrichs and Thuen).

A significant improvement in existing process control methodology would result from incorporating suitable analytic models. The predictions of future behavior of the cure process could then be used to make decisions about the future course of the cure process. Therefore, the object of the present invention is to provide a methodology employing analytic models for continuously selecting new optimal cure cycles during the curing process in response to actual material behaviors which occur over time within the composite part during the curing process.

BRIEF DESCRIPTION OF THE INVENTION

The present invention comprises a method for controlling the process of curing a composite material part in a curing vessel. An initial cure cycle is selected for the composite part within the vessel. The curing process of the composite material part is begun in accordance with the initially selected cure cycle. An actual part temperature of the part is measured during the curing process. The pressure within the curing vessel is also measured during the curing process. At least one additional real part parameter value is directly measured during the curing process. The additional real part parameter value is compared to a predicted part parameter value determined from a predictive analytic model. A new cure cycle is selected during the curing process when the additional real part parameter value falls outside of a predetermined acceptable range about the predicted part parameter value. Once a new cure cycle is chosen the curing process is adjusted accordingly.

BRIEF DESCRIPTION OF THE FIGURES

FIG. 6. Graph of theoretical degree of cure of a part having 32 plies calculated from the cure kinetics model.

DESCRIPTION OF THE PREFERRED EMBODIMENT

Figure 1:
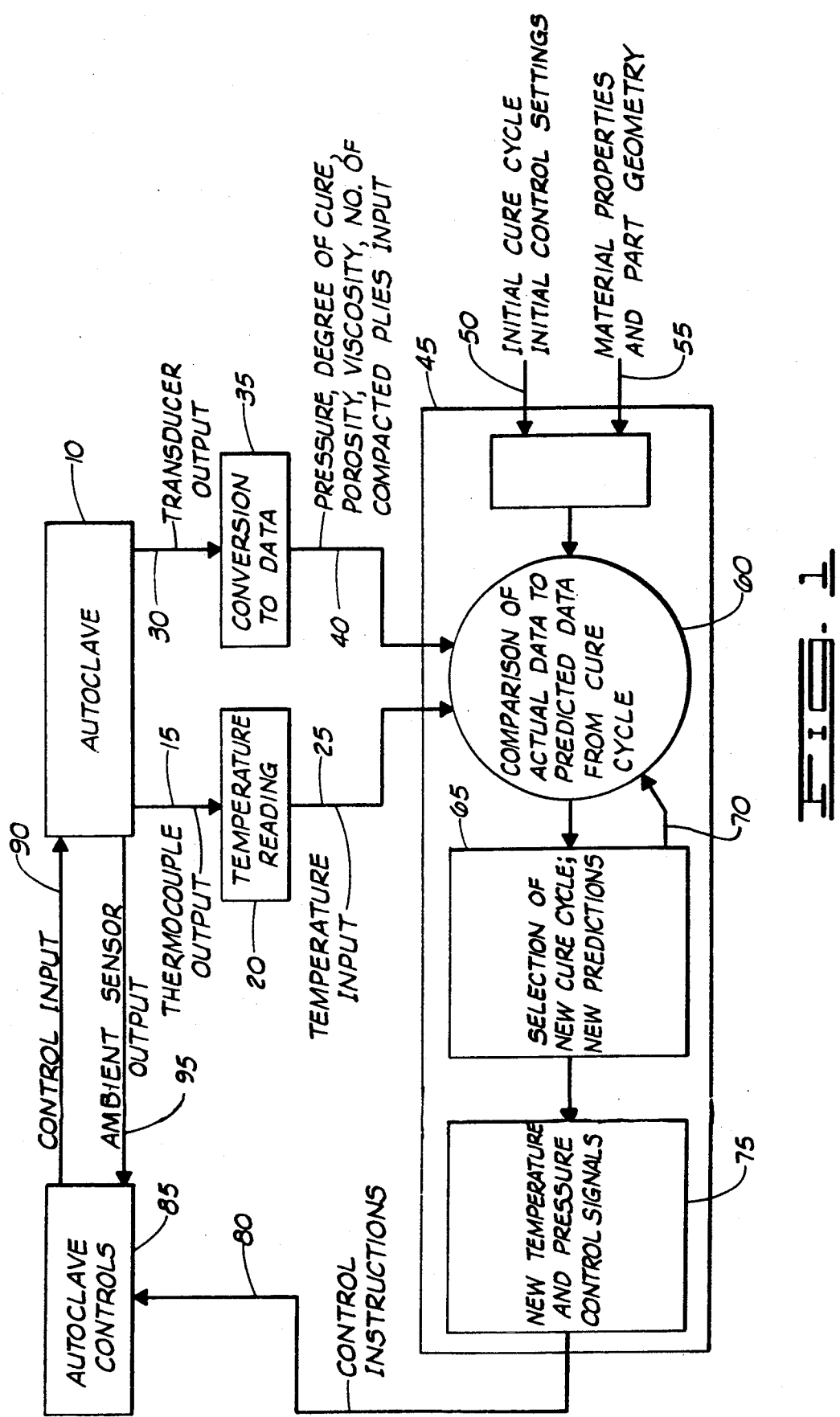
FIG. 1. Schematic view of a preferred embodiment of the system used in the present invention.

The present invention comprises a method for controlling a curing process of a composite material part in a curing vessel such as an autoclave. Essentially, the method comprises the selection of a new cure cycle periodically during the curing process which serves as a basis for adjusting the curing process. The selection process employs predictive analytic models capable of predicting maximum temperature, degree of cure, viscosity and compaction of plies of the part over time.

In one embodiment of the selection process, the first step comprises obtaining initial values for material and properties including density, specific heat, thermal conductivity, initial mass of resin and fiber and temperature of the part. The next step comprises providing an initial set of cure cycles. A cure cycle is defined herein as describing the temperature within a curing vessel such as an autoclave as a function of time during the curing process. The cure cycle serves as a set of instructions for selecting the ambient temperature within the vessel at any given time during the curing process.

Following this, using the analytic models discussed above, a computer simulation of each cure cycle in the set is run to predict the length of time which would be required for the cure cycle to satisfy a set of conditions including: a predetermined acceptable degree of cure of the part, compaction of all the plies of the part, minimum porosity of the part, and maintenance of an internal part temperature (where internal temperature is defined as any surface or interior temperature) below a predetermined maximum value during the cure process.

The next step is the selection of, as an initial cure cycle, the cure cycle in the set of cure cycles which was predicted to satisfy the set of conditions in the shortest time. Following this the composite material part is disposed within an autoclave for during and the autoclave process conditions are set at the temperature and pressure levels dictated by the initial cure cycle, and the cure process is begun.

Following this is the step of monitoring the ambient levels of temperature and pressure within the autoclave and adjusting the levels as needed in accordance with the initial cure cycle profile.

The next step is taking a set of measurements at a predetermined time interval after the initiation of the cure process wherein the set of measurements includes temperature of the part and a number of ultrasonic velocity measurements for the part. Dielectric constant measurements may also be made. These measurements are used to determine real parameter values for the maximum temperature of the part, the degree of cure of the part (as determined from the elastic modulus or dielectric constant of the part), the resin viscosity, the porosity of the resin and the number of compacted plies of the part (which may be measured directly from ultrasonic measurements, or estimated indirectly from fiber volume fraction figures). These real parameter values are then compared with the predicted parameter values predicted from computer simulations of the initial cure cycle.

Following this, a new cure cycle is selected if at least one of the real parameter values falls outside of acceptable ranges of the predicted parameter values predicted by the initial cure cycle. The new cure cycle is selected by following the same steps used to select the initial cure cycle profile including providing a set of cure cycles and running computer model simulations of each cure cycle in the set.

If a new cure cycle is selected, process conditions of the autoclave are adjusted in accordance with the conditions dictated by the new cure cycle. Monitoring of the curing process of the part continues by repeating the steps of determining real part parameter values at intervals, comparing the real part parameter values to predicted part parameter values, selecting a new cure cycle profile if conditions warrant and adjusting process conditions until the 10 composite part has achieved a predetermined cure status at which point the cure process is completed.

The present invention comprises a method using both hardware (autoclave and data acquisition system, computer controlled) and software (signal processing, calculations for composite microstructure characterization, process control algorithms) for the real time, on-line, computer-controlled operation of the cure cycle of composite materials. The hardware used in the present invention is known in the art of composite curing and is commercially available.

The process uses:

(1) A composite tool which is compatible with existing operations and is instrumented with ultrasonic transducers/sensors.

(2) Autoclave controls (temperature/pressure) interfaced with a laboratory minicomputer.

(3) Target values for acceptably processed parts (porosity, degree of cure, number of compacted plies, maximum temperature).

(4) A suitable process control algorithm to automatically adjust process parameters if target values are not met.

The autoclave is equipped with transducers to monitor the applied pressure and thermocouples to monitor the temperature distribution within the part. High temperature ultrasonic sensors are also employed.

In a standard autoclave epoxy cure operation, the material is first heated to an intermediate temperature to fluidize the resin and held at that temperature for a period of time. During this phase a vacuum is applied to eliminate entrained air and consolidate the material. Subsequent to this temperature dwell, the temperature is increased to a level required to completely cure the materials. Within experimental limitations, heating rate, dwell time, and applied pressure all affect cure quality.

The present invention includes a defect classification/pattern recognition algorithm which is compatible with the cure monitoring function yet sufficiently flexible to be sensitive to the wide variety of defects which might occur in processing. The algorithm is based on classification of certain types of defects according to, for example, waveform features in attenuation and velocity measurements. Defects can include excessive moisture content, porosity in the bulk adhesive, debonded regions, voids, and overstaged or understaged charge materials.

As mentioned above, realistic analytic dynamic resin behavior models incorporated into a user-friendly computer code are used for real time cure analysis. Design of a computer code for solving the analytic models and integrating the solutions into the cure cycle selection process and autoclave control system is within the ability of a person skilled in the art.

Depending on the feedback signals, the code analyzes the process and suggests proper changes in the processing variables. Hence, a closed-loop control of cure cycle with real time process simulation satisfies the following criteria:

The temperature of the composite does not exceed a predetermined maximum value during the cure cycle.

The final part is cured uniformly and completely with minimum void content and minimum porosity.

The residual stresses are minimized and the desired thermomechanical properties are obtained.

The cure cycle is completed in the shortest possible time.

A schematic representation of a preferred embodiment of the system for data processing, signal processing, and autoclave control is shown in FIG. 1. A composite part (not shown) which is to be cured is disposed within an autoclave 10 or other similar vessel capable of subjecting the part to high temperatures and pressures. After the cure process has been initiated, thermocouple output 15 is provided to a temperature reading means 20 which in turn provides temperature input 25 into a data processing unit 60 of the computer 45.

Similarly, transducer output 30 is provided to a means 35 for converting the transducer output 30 into information regarding the pressure, degree of cure, porosity, viscosity and number of compacted plies in the part which serves as input 40 into a data processing unit 60 of the computer 45. Additional input regarding the initial cure cycle and initial control settings 50 and the material properties and geometry of the part 55 serve as input into the computer 45.

After data input 25, 40, 50, 55 the data processing unit 60 of the computer 45 compares the actual data from the part within the autoclave 10 to the data predicted from the cure cycle. Based on the results of this comparison, a new cure cycle is selected 65 and a new set of predictions based on the new cure cycle is computed. These new predictions are fed back 70 into the processing unit 60 and serve as a new set of predicted data.

Based on the selection of a new cure cycle, a new set of temperature and pressure control signals ma be selected 75 and will serve as input 80 for the autoclave control means 85. The autoclave control means 85 will provide control output 90 to regulate the ambient temperature and pressure of the autoclave 10 and will receive output 95 from the autoclave 10 regarding the ambient temperature and pressure conditions within the autoclave 10.

In a preferred embodiment signal acquisition 35 is achieved using a transient digitizer with 1 GHz sampling capability, eight-bit vertical resolution and a maximum storage capacity of $2^{15}$ points/waveform. The digitizer is interfaced directly to a laboratory minicomputer 45. Defect inspection is performed at predetermined time intervals during the cure cycle. Gross defects such as voids or inclusions are identified when the signal between the reflections off the top and bottom surfaces of the part exceeds a predetermined threshold value. More subtle defects (overcure, undercure, fiber segregation, porosity) require more detailed analysis of the velocity data. Suitable pattern recognition algorithms achieve this end.

For process control, if the measured ultrasonic velocity fails to meet the target criteria established for a selected cure cycle, action is taken by the computer to adjust temperature or to adjust autoclave pressure accordingly.

For some defects it is possible to take corrective action to allow the part to be salvaged. If, for example, a high degree of porosity or voids are identified, increasing the applied pressure might resolve the problem. Obviously, there are cases where no corrective action is successful. These parts are identified as soon as possible to abort the cure cycle.

Prior to the initiation of the cure process, composite property values for parameters such as the density, specific heat, thermal conductivity, initial mass and fiber, and other parameter values of the composite material ar provided by the manufacturer or are known from published data. For example, see A. Loos and G. Springer, "Curing of Epoxy Matrix Composites," *Journal of Composites*, Vol. 17, pp. 135-169 (1983), which is specifically hereby incorporated herein by reference. An initial part temperature at which to begin the curing process is chosen, often from values provided by the composite manufacturer.

Figure 2:
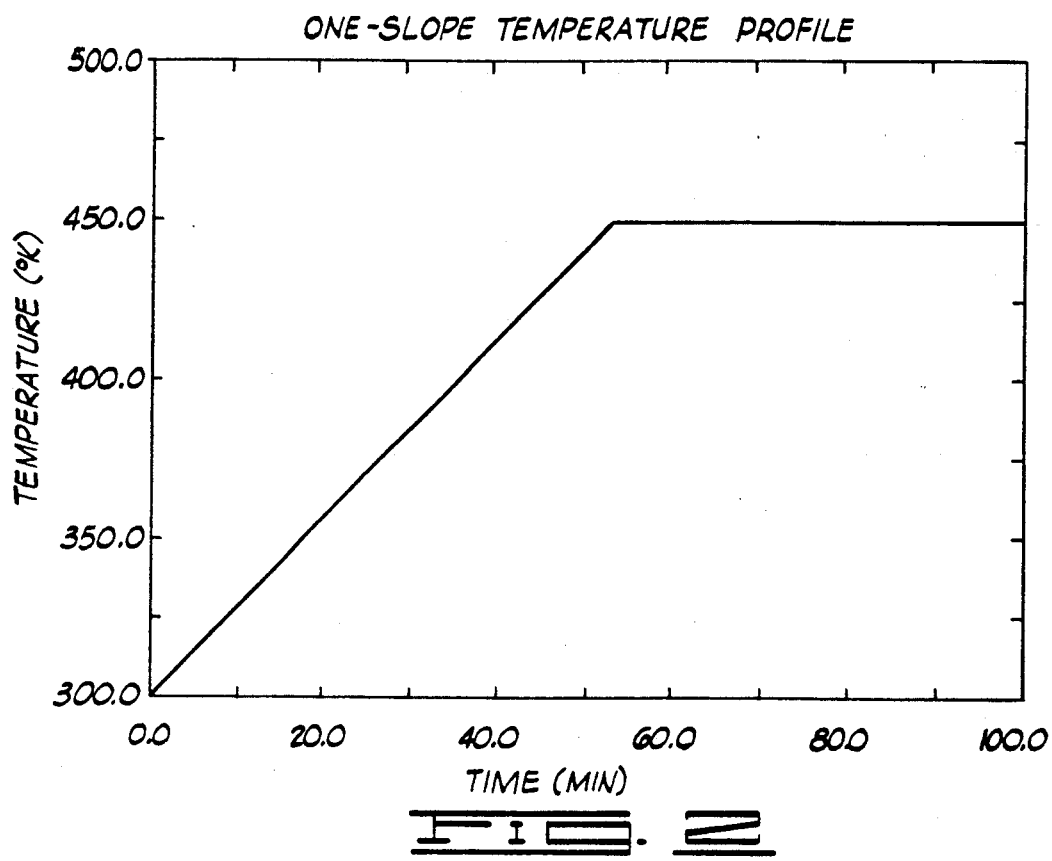
FIG. 2. Graph of a one-slope cure cycle.
Figure 3:
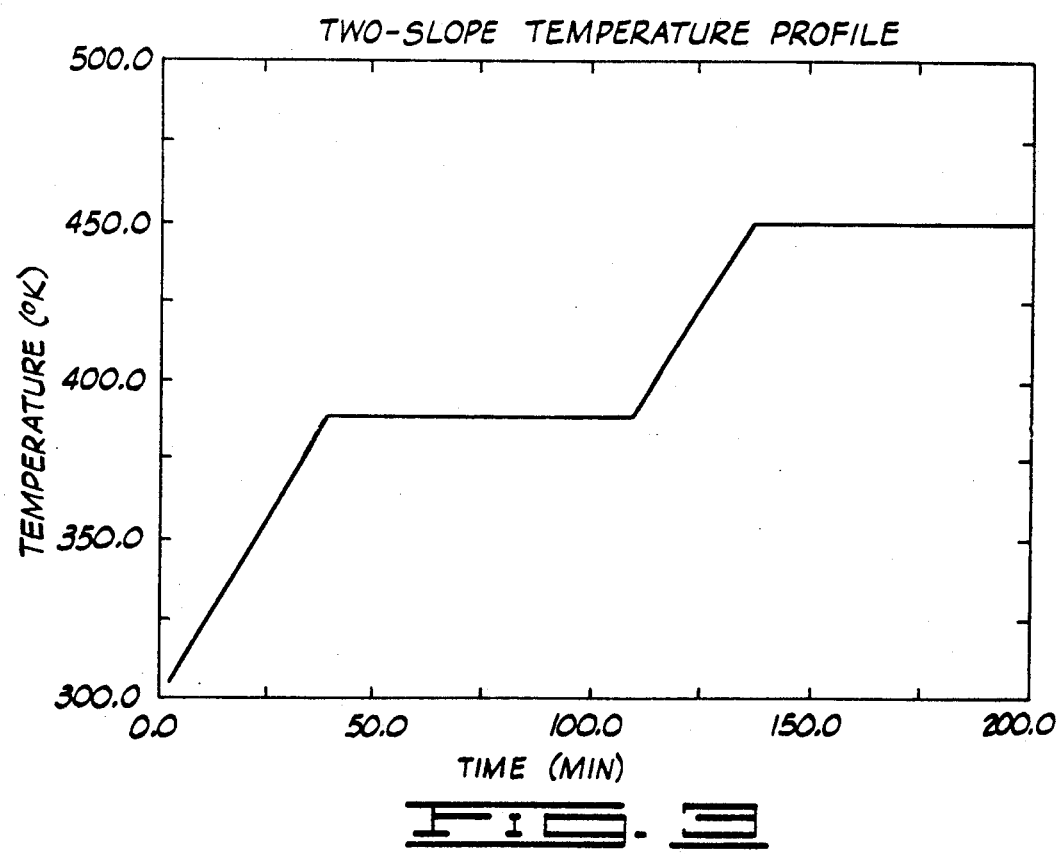
FIG. 3. Graph of a two-slope cure cycle.
Figure 4:
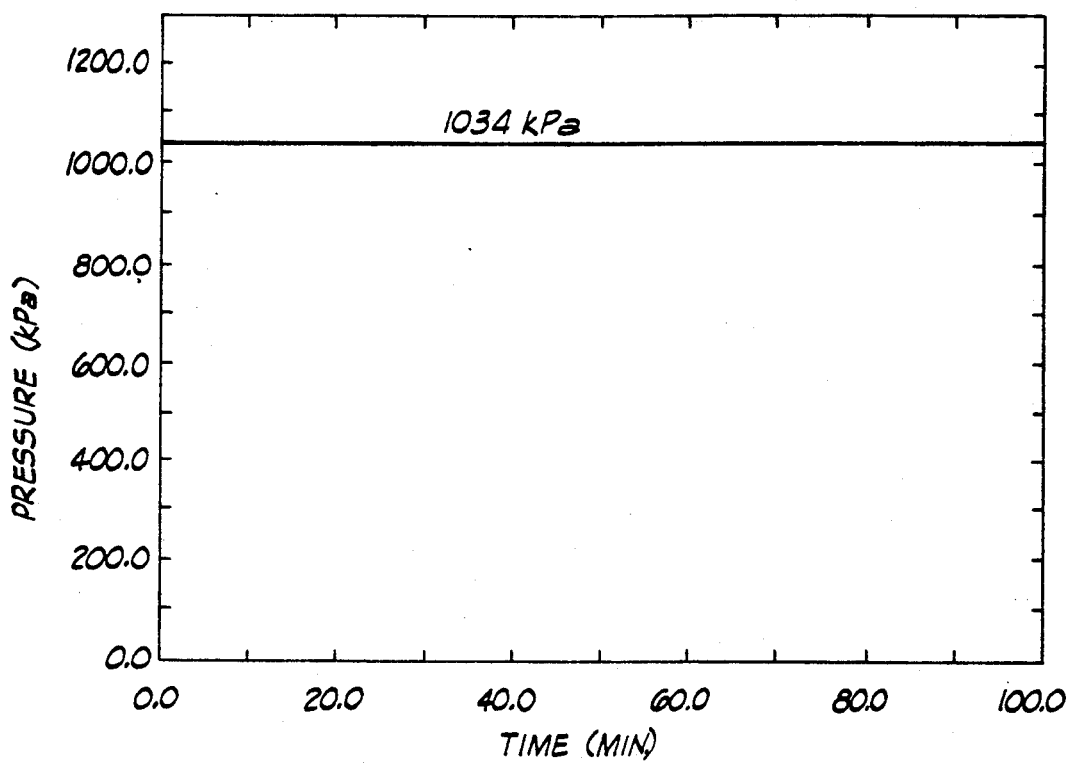
FIG. 4. Graph of an initial autoclave pressure profile used during a cure cycle.

Before an initial optimum cure cycle can be selected, an initial set of cure cycles must be determined. The manufacturer often offers a suggested cure cycle which can be used as a reference. For example, FIG. 2 shows a one-slope cure cycle suggested by a manufacturer. In this cure cycle, the autoclave has an initial temperature of 300 K. After initiation of the cure process, the temperature of the autoclave is increased linearly, as indicated by the linear positive slope, until the autoclave reaches a predetermined maximum temperature, which in FIG. 2 is 450 K. In a conventional curing process, unlike the process described for the present invention, the autoclave is held constant at this temperature for the duration of the curing process. Other forms of cure cycles such as the two-slope cycle shown in FIG. 3 may also be suggested by the manufacturer. An autoclave pressure is initially set at some pressure level as indicated in FIG. 4.

Analytic Models Used In The Selection Process

Figure 5:
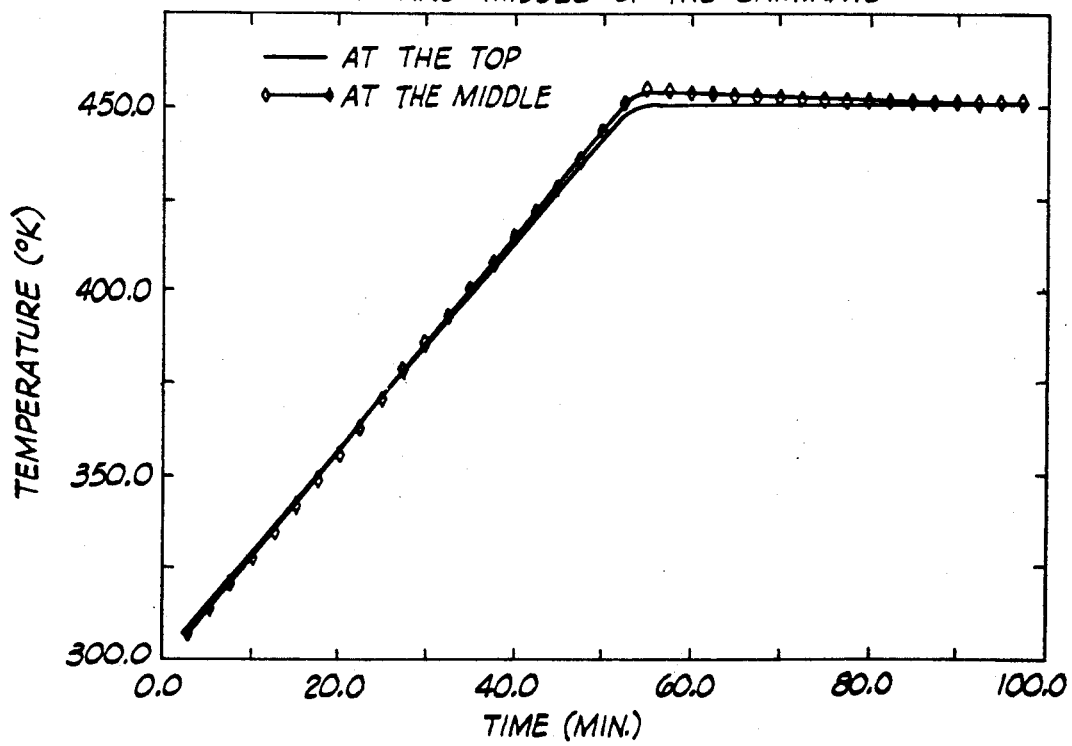
FIG. 5. Graph of theoretical surface and middle part temperatures generated from the thermochemical model.
Figure 5:
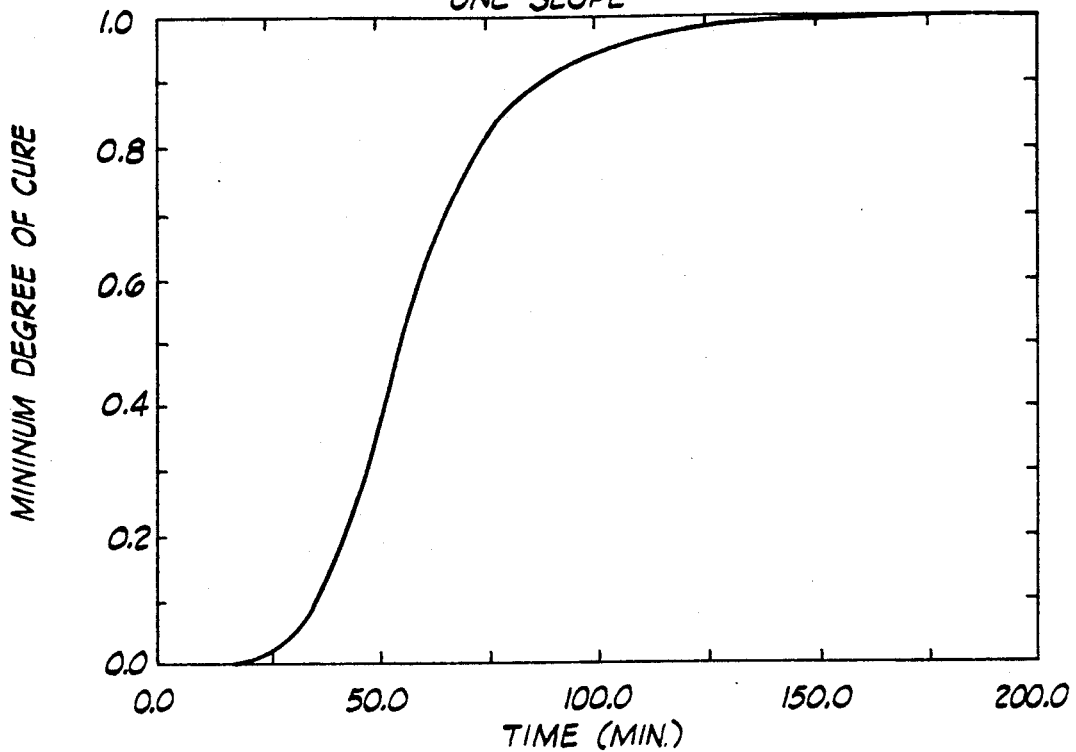
Figure 7:
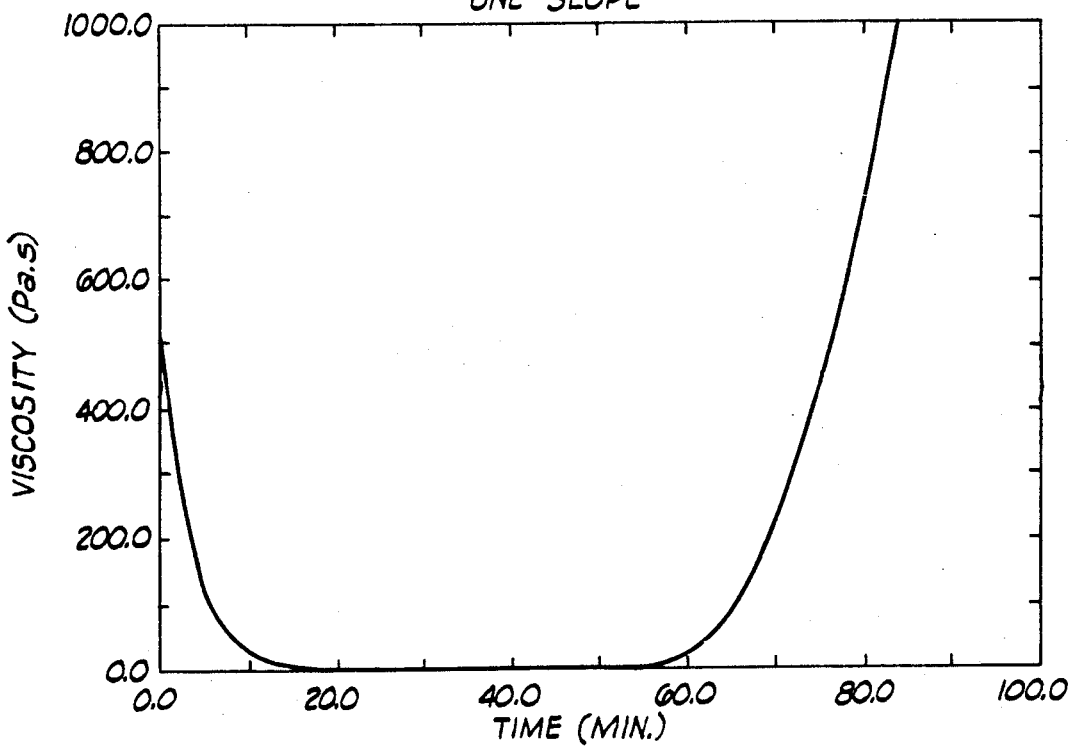
FIG. 7. Graph of theoretical resin viscosity of a part having 32 plies calculated from the viscosity model.
Figure 8:
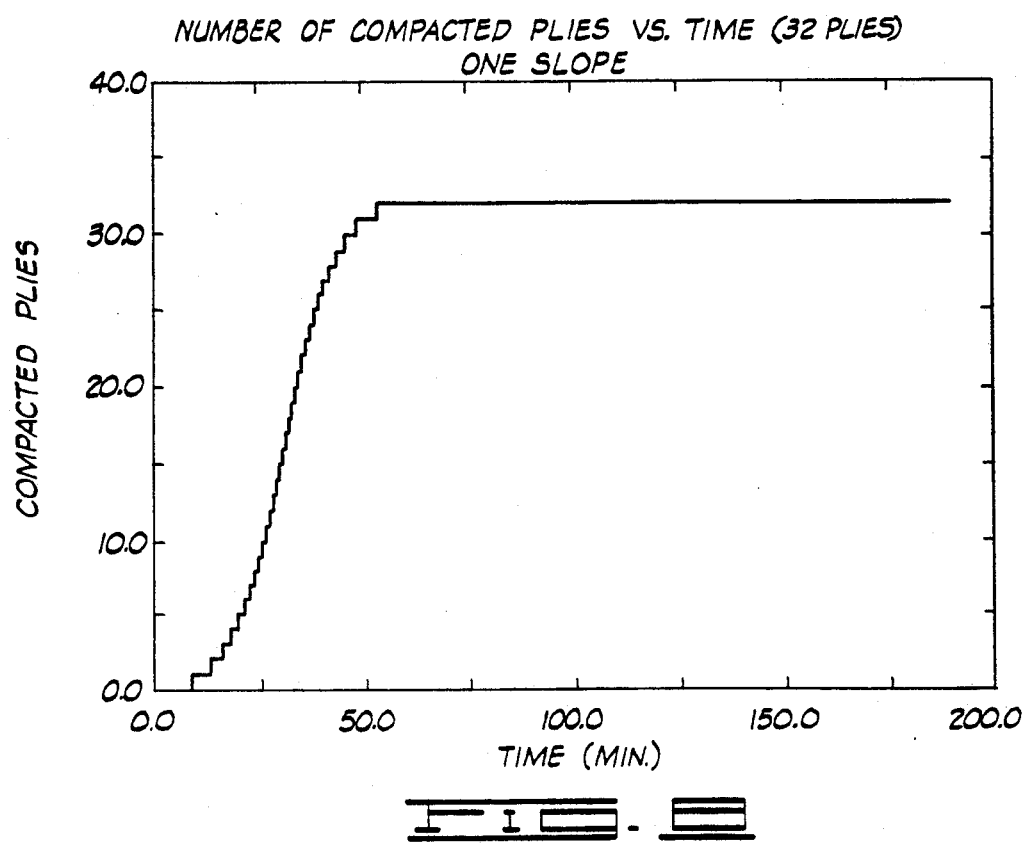
FIG. 8. Graph of theoretical number of compacted plies of a part having 32 plies calculated from the resin flow model.
Figure 9:
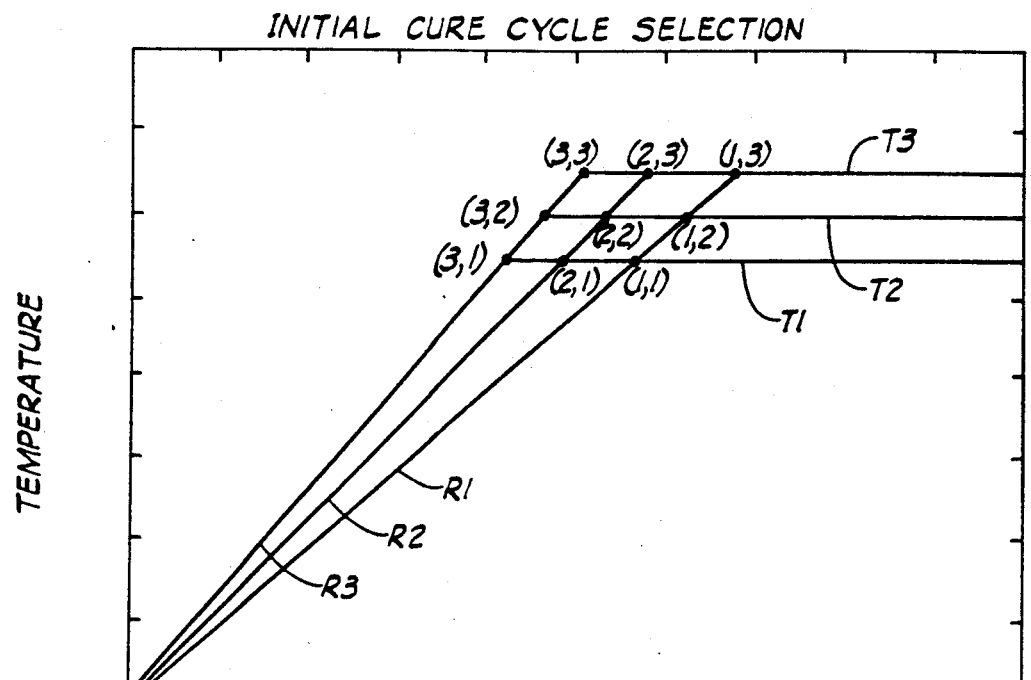
FIG. 9. Graph of an initial set of nine cure cycles.

The process of the present invention relies on the use of several analytic models which simulate the behavior of the cure process. The models required in the present process are a thermo-chemical model, a cure kinetics model, a viscosity model and a resin flow model. The thermo-chemical model provides a theoretical temperature distribution vs. time curve (FIG. 5). The cure kinetics model provides a theoretical degree of cure time curve (FIG. 6). The resin flow model provides a theoretical viscosity vs. time curve (FIG. 7). The resin flow model provides a theoretical number of compacted plies vs. time curve (FIG. 8). A set of initial cure cycles, as represented by the set of cure cycles in FIG. 9, is used to provide initial and boundary conditions for the solution by computer of the series of cure process models as described below.

In the preferred embodiment of the present invention, the thermo-chemical, cure kinetics, resin flow and viscosity models are those described in W. Lee, A. Loos and G. Springer, "Heat of Reaction, Degree of Cure, and Viscosity of Hercules 3501-6 Resin," *J. Composite Materials*, Vol. 16, pp. 510-520, (Nov., 1982) which is specifically hereby incorporated herein by reference and in the article by Loos and Springer cited above and therein incorporated by reference. However, other embodiments of the present invention may rely on other versions of analytic models which also describe the thermo-chemical, cure kinetics, degree of cure and resin flow of materials under the conditions of the curing process.

Examples of articles which describe other models which may be used as analytic models in the present invention or which include discussion of methodologies which can be utilized in the present invention include: G. Springer, "Resin Flow During the Cure of Fiber Reinforced Composites," *J. Composite Materials*, Vol. 16, pp. 400-410, (Sept., 1982); T. Gutowski, "A Resin Flow/Fiber Deformation Model for Composites," *SAMPE Quarterly*, Vol. 16(4), pp. 58-64 (July, 1985); R. Dave, J. Kardos and M. Dudukovic, "A Model for Resin Flow During Composite Processing: Part 1— General Mathematical Development," *Polymer Composites*, Vol. 8(1), pp. 29-38, (Feb., 1987); R. Dave, J. Kardos, and M. Dudukovic, "A Model for Resin Flow During Composite Processing Part 2: Numerical Analysis for Unidirectional Graphite/Epoxy Laminates," *Polymer Composites*, Vol. 8(2), pp. 123-132 (April 1987); R. A. Kline and Z. T. Chen, "Ultrasonic Technique for Global Anisotropic Property Measurement in Composite Materials," *Materials Evaluation*, Vol. 46, pp. 986-992, (June, 1988); R. A. Kline, "Wave Propagation in Fiber Reinforced Composites for Oblique Incidence," *J. of Composite Materials*, Vol. 22, pp. 287-303 (March, 1988); R. A. Kline and R. V. Kulathu, "On-Line Monitoring of Composite Prepreg Fabrication," Paper presented at the Winter Meeting of the A. Soc. of Mech. Engr., Atlanta, Ga., (Dec., 1991); and R. A. Kline, "Ultrasonic Characterization of Composite Microstructure," unpublished. The articles listed above are specifically hereby incorporated herein by reference.

Thermo-Chemical Model

In the present invention, the theoretical temperature distribution vs. time curve (FIG. 5) is derived for a given cure cycle and is used to determine if the internal temperature generated within the composite part under the conditions of that given cure cycle will exceed a predetermined maximum acceptable temperature at any location in that part during the curing process. FIG. 5 shows the results from the solution of the thermo-chemical model using the cure cycle shown in FIG. 2 as boundary conditions wherein the maximum acceptable temperature is 450 K. The curve indicates that the surface temperature of the part would not exceed the allowable maximum temperature of 450 K. However, the temperature in the middle of the composite part would theoretically exceed 450 K. and therefore would exceed the maximum allowable temperature during the curing process for this part.

Cure Kinetics Model

The theoretical degree of cure vs. time curve (FIG. 6) is also derived for a given cure cycle and is used to determine at what time in the curing process the part will achieve a minimum acceptable degree of cure. FIG. 6 shows the results from the solution of the cure kinetics model using the cure cycle shown in FIG. 2. If the minimum acceptable degree of cure which must be achieved is, for example, 95% of total cure, the curve in FIG. 6 indicates that it would take approximately 100 minutes to achieve the minimum degree of cure. A theoretical degree of cure vs. time curve would be obtained for each cure cycle in the initial set of cure cycles to determine the length of time each cure cycle would require to achieve the minimum acceptable degree of cure.

Viscosity Model

The theoretical viscosity vs. time curve (FIG. 7) is also derived for a given cure cycle and is used to determine at what time during the curing process the gel point in the composite will occur. FIG. 7 shows the results when the viscosity model is solved for the cure cycle in FIG. 2. As discussed earlier, the gel point is the level of resin viscosity at which the resin within the part gels and ceases to flow sufficiently to allow for the expulsion of gas bubbles from the resin. Therefore, measures taken to reduce porosity must occur before the gel point is reached.

Gel point is a known parameter having units of viscosity and is known for a given composite material. Therefore, the time to gel point can be determined theoretically from the viscosity vs. time curve derived for a given cure cycle by measuring at what time the viscosity level corresponding to the gel point will occur.

Resin Flow Model

The theoretical number of compacted plies vs. time curve (FIG. 8) is derived for a given cure cycle from the resin flow model. The curve is used to determine if all plies in the composite part can be compacted at some initial pressure level and, if all plies can be compacted, how long is required for complete compaction. FIG. 8 shows the results when the resin flow model is solved for the cure cycle in FIG. 2. The results indicate that all plies would theoretically be compacted in just over fifty minutes.

Initial Set of Cure Cycles

An initial "first guess" cure cycle, for example, the cure cycle suggested by the manufacturer, is chosen. The "first guess" cure cycle is used to generate the other cure cycles in the initial set of cure cycles as described hereinafter.

Nine cure cycles are represented in FIG. 9. The nine cycles are generated from the combinations of three different heating rates and of three different maximum cure cycle temperatures. The "first guess" cure cycle provides an intermediate heating rate and temperature. Two other heating rates, one a specified percent greater than the "first guess" rate, and a second a specified percent less, are selected. Two other temperatures, one a specified percent greater than the "first guess" temperature and a second a specified percent less, are selected. The percentage differences may be from 5 to 10%.

The three rates are shown as rate R1, rate R2 and rate R3, where R1 is less than R2 and R2 is less than R3. The three maximum temperature levels are, temperature T1, temperature T2 and temperature T3, where T1 is less than T2 and T2 is less than T3.

Each cure cycle on FIG. 9 is represented by a pair of numbers wherein the first number is the initial rate (or slope) of the cycle before it levels off and the second number is the maximum temperature level reached in that cure cycle.

In FIG. 9, cure cycle (1,1) is the cure cycle in which the temperature rises at rate R1 to a maximum temperature T1 where the temperature then remains constant. In cycle (2,1), temperature rises at rate R2 to a maximum temperature T1. In cycle (3,1) temperature rises at rate R3 to a maximum temperature T1. It will be observed that in cycle (2,1), the maximum temperature in the autoclave is reached earlier than in cycle (1,1) and later than in cycle (3,1).

In cure cycle (1,2), temperature rises at rate R1 to a maximum temperature T2. In cycle (2,2), temperature rises at rate R2 to a maximum temperature T2. In cycle (3,2), temperature rises at rate R3 until it reaches a maximum temperature T2. It will be observed that in cycle (1,2), temperature rises at the same rate as in cycle (1,1) but that it ultimately reaches a higher temperature. In cycle (2,2), temperature T2 is reached earlier than in cycle (1,2), but later than in cycle (3,2).

In cycle (1,3) temperature rises at rate R1 to a maximum temperature of T3. In cycle (2,3) temperature rises at rate R2 to a maximum temperature of T3. In cycle (3,3) temperature rises at rate R3 to a maximum temperature T3. It will be observed that in cycle (1,3) temperature rises at the same rate as in cycle (1,2) and cycle (1,1), but that it ultimately reaches and is maintained at a higher temperature than cycle (1,2). In cycle (2,3) the maximum temperature T3 is reached earlier than in cycle (1,3) but later than in cycle (3,3). Thus FIG. 9 represents the initial set of cure cycles. From this initial set of cure cycles will be selected the initial cure cycle for the curing process.

Selecting an Initial Cure Cycle

Figure 10:
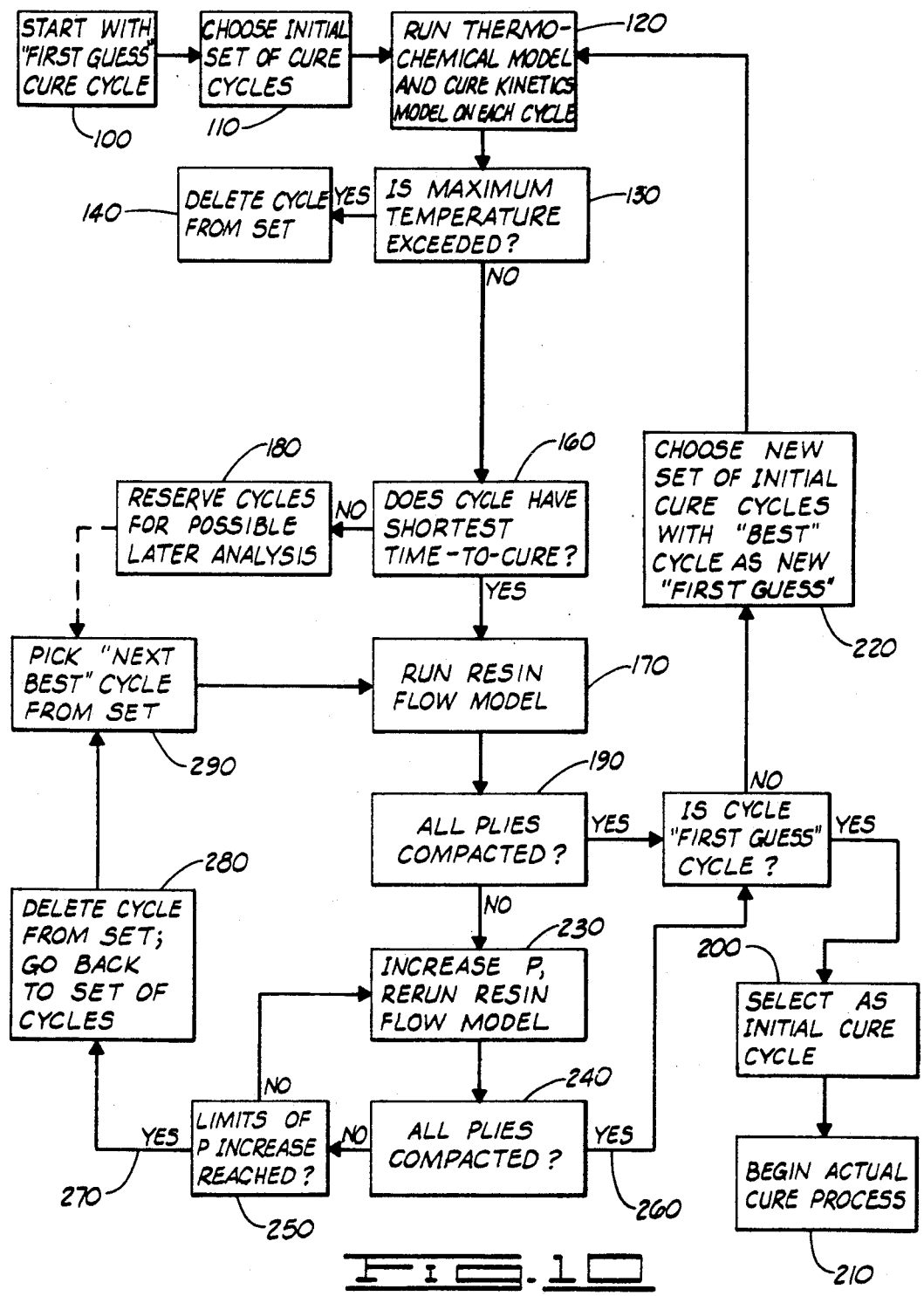
FIG. 10. Schematic representation of the initial cure cycle selection process of a preferred embodiment of the present invention.

The first two steps in the process of selecting the initial cure cycle, i.e., the selection of a "first guess" cure cycle and the determination of an initial set of cure cycles, are represented in FIG. 10 as steps 100 and 110, respectively and have been discussed above. In the next step the thermo-chemical model and the cure kinetics model are run for each cure cycle in the initial set (step 120).

The next step 130 (FIG. 10) in the initial cure cycle selection process is to determine, from the theoretical results of the thermo-chemical model, which of the cure cycles in the initial set will result in causing a composite part to exceed, at any location in the part, the maximum allowable temperature during the curing process. Cure cycles which exceed this level are eliminated from further consideration (step 140).

The cure kinetics model, run concurrently in Step 120 with the thermo-chemical model, gives a theoretical time-to-cure for the cure cycle. The determination of the cure cycle with the shortest time-to-cure is made by comparing the time-to-cure of each cycle remaining in the set (step 160).

Next, the resin flow model is computed for the cure cycle having the shortest theoretical time-to-cure (step 170). The cure cycles having longer theoretical times to-cure are reserved for possible later analysis (step 180) in the event the cycle having the shortest time-to-cure (temporarily designated as the "best" cure cycle) does not achieve the other requirements which must be met for selection as the initial cure cycle.

The results of the resin flow model (compacted plies vs. time) reveal if the "best" cycle will result in the compaction of all of the plies of the part before the end of the curing process (step 190). If all plies of the part will be compacted, and the cure cycle is the "first guess" cycle used to construct the initial set of cure cycles (cycle (2,2) in FIG. 9) the cycle is selected (step 200) as the initial cure cycle. The initial cure cycle selection process thus ends and the actual curing process can begin (step 210).

However, if the "best" cycle is not the "first guess" cure cycle profile, the selection process continues (step 220) wherein is provided a new set of initial cure cycles with the "best" cure cycle serving to provide the intermediate values for slope and maximum temperature as the basis for the new set.

For example, assume that cycle (3,3) in FIG. 9 is identified as the "best" cure cycle in the set of cure cycles shown in FIG. 9. This cure cycle then serves as the "new first guess" (step 220) for a new set of cure cycles, having combinations of heating rates and maximum temperature values which differ from the "new first guess" by specified percentages.

The new set of cure cycles is then subjected to the same series of steps (120–190) wherein again is identified the cure cycle which has the shortest time-to-cure and which gives complete compaction. If the "best" cure cycle so identified is the "new first guess" (the cycle having intermediate levels of heating rate and maximum temperature), the selection process ends with the new first guess selected as the initial cure cycle (step 200) and the cure process can proceed (step 210). If the "best" cure cycle is not the "new first guess" cycle, the process is repeated again.

Alternatively, the cure cycle having the shortest time-to-cure may not satisfy the requirement for compaction of all plies at the initial pressure level. In this event the computer simulation of the resin flow model is run again for the cycle (step 230) but with an increased autoclave pressure parameter which is a specified (e.g., 5 to 10%) percentage higher than the initial pressure. Step 230 is repeated at incrementally increased pressures (steps 240–250) until the requirement for compaction of the plies is finally met (step 260) or is determined to be not practical (step 270) within the bounds of the autoclave's operational parameters. If the compaction requirement is met (step 260) and if the cure cycle is eventually selected as the initial cure cycle (step 200), the highest pressure level used in the simulations becomes the initial pressure used in the actual curing process (step 210).

In the event that the requirement of compaction of all plies cannot be met (steps 250, 270) for the given cure cycle under any feasible pressure level, this cure cycle is eliminated (step 280) from the set of cure cycles.

The selection process continues with the selection (step 290) of the cure cycle have the next shortest time-to-cure. The resin flow model is then run (step 170) for this newly chosen "best" cure cycle, and a determination is made if the cure cycle meets the ply compaction requirement (step 190). The process continues as outlined above until step 200 is carried out and an initial cure cycle is selected.

The process could be modified to include an initial cure cycle set of either less than or more than nine cure cycles in the selection scheme, as will be readily appreciated by those skilled in the art.

Cure Control Strategy—Selection of a New Cure Cycle During the Curing Process

At a predetermined time interval after the curing process has been initiated, a number of parameters of the composite part are measured or estimated. These parameters include maximum part temperature, degree of cure of the part, resin velocity within the part and the number of compacted plies within the part. These parameters are measured directly (in the case of temperature) or estimated from other measurements (in the case of degree of cure, resin velocity and number of compacted plies). Progress of the cure process is determined by these measured or estimated values and decisions regarding the cure cycle are made based on these parameter values.

Part Temperature

Figure 11:
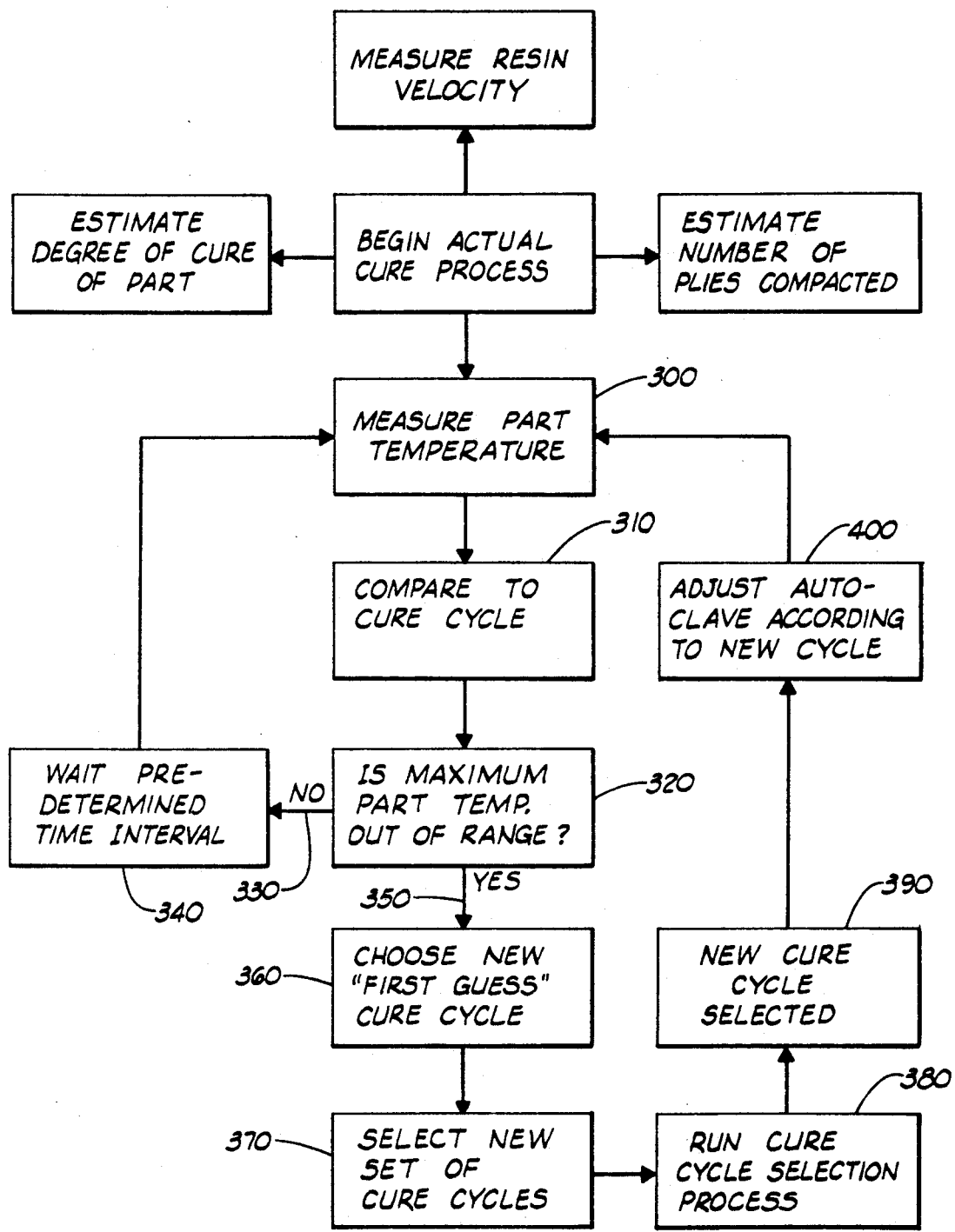
FIG. 11. Schematic representation of the theoretical vs. actual temperature comparison process of a preferred embodiment of the present invention.

Temperature of the composite part in the autoclave (or other processing vessel) is measured at a predetermined time after initiation of the cycle by thermocouples distributed on the upper and lower surface of the part (Step 300, FIG. 11). Thermocouples may also be located within the part. The temperature obtained from the part which is the highest measured at that predetermined time is referred to as the maximum part temperature.

Figure 12:
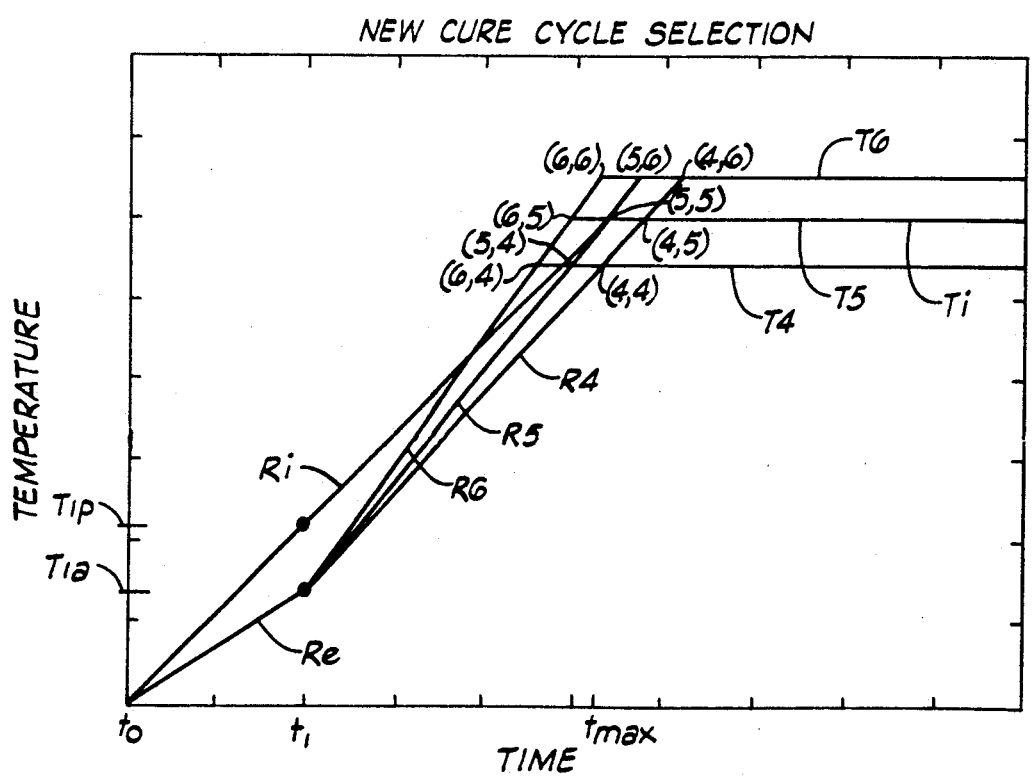
FIG. 12. Graph of a new set of cure cycles determined during the cure cycle selection process of a preferred embodiment of the present invention.

This maximum part temperature, which may occur at any location on or within the part, is compared to the temperature value of the initial cure cycle for that particular time period in the cure process (Step 310). For example, FIG. 12 shows an actual maximum part temperature $T_{1a}$ measured at time $t_1$. The temperature value of the initial cure cycle predicted for that time $t_1$ is $T_{1p}$. FIG. 12 indicates that in this case, at time $t_1$, temperature $T_{1a}$ is some magnitude lower than temperature $T_{1p}$, the temperature predicted from the cure cycle for that time interval.

The next step in the process (Step 320) is to determine if the measured maximum part temperature $T_{1a}$ falls outside of a predetermined range above or below the predicted cure cycle temperature $T_{1p}$. This range constitutes an acceptable deviation. In one embodiment, the range may be 5% above or below $T_{1p}$ or in another embodiment it may be some lesser percentage much as 2%. In another embodiment the range may be up to 10%. In another embodiment the acceptable deviation above the predicted temperature $T_{1p}$ may be less than the acceptable deviation below the predicted temperature $T_{1p}$.

If the maximum part temperature is within the acceptable range, (Step 330), the current cure cycle is maintained and the cure process is continued as previously determined. After a predetermined time interval is allowed to elapse (Step 340), another set of temperature measurements of the part is taken (Step 300) and the highest of these (maximum part temperature) is again compared to the temperature predicted for that time (Step 310). The elapsed time interval between measurements may be as little as one millisecond or as much as ten minutes, but more preferably is between 30 seconds and 5 minutes. As will be appreciated by the average person skilled in the art of computer science, data processing speed is directly related to the power of the computing device. Therefore a more powerful computer would enable a shorter time interval between selections of new cure cycles.

If instead of being within the acceptable range, the measured maximum part temperature is outside of the range (Step 350), a new cure cycle must be chosen to replace the previous cure cycle. A new "first guess" cure cycle must be chosen as the first step (Step 360) in selecting a new cure cycle.

The new "first guess" cure cycle is chosen as indicated in FIG. 12. The initial rate of temperature increase $R_i$ is replaced with a cure rate curve made up of a slope representing the estimated heating rate through time $t_1$ to temperature $T_{1a}$. This estimated heating rate from time to at time zero to time $t_1$ is rate $R_e$, as shown on FIG. 12. Rate $R_e$ represents heating in the autoclave which has already occurred and therefore must be incorporated into the new "first guess".

The rate of heating to occur in balance of the cure cycle, after $t_1$, must now be chosen. A new heating rate, beginning at time $t_1$, is chosen by choosing the previous maximum temperature to be obtained ($T_i$ in FIG. 12) and the time $t_{max}$ at which $T_i$ was scheduled to be attained in the previous cure cycle. In FIG. 12, $T_i = T5$, thus, the new "first guess" in FIG. 12 is a cure cycle having heating rate $R_e$ to time $t_1$ and a rate R5 from $t_1$ to time $t_{max}$ wherein a maximum temperature T5 is reached and held until the end of the cure process and serves as the new "first guess" cure cycle (Step 360).

The cure cycle in FIG. 12, having a rate R5 and temperature T5 is designated as cycle (5,5) and serves as the "first guess" from which the other cycles ((4,4)–(4,6), (5,4), (5,6) and (6,4)–(6,6)) in the new set of initial cure cycles are chosen (Step 370). Each of the heating rates of the new set of cycles has the same rate $R_e$ up to time $t_1$.

Having determined a new set of initial cure cycles (Step 370), the cure cycle selection process, as described in Steps 120–290 in FIG. 10, is carried out (Step 380, FIG. 11). Once a new cure cycle has been chosen (Step 390, FIG. 11), the autoclave controls for temperature and pressure are adjusted as indicated by the parameters of the new initial cycle (Step 400). The process shown in FIG. 11 is repeated, at predetermined intervals, until completion of the curing process. Each time a decision is made to choose a new "first guess" cure cycle as a prelude to selection of a new cure cycle, the previous temperature history of the cure process is incorporated into the "initial guess" cure cycle.

Degree of Cure of the Part

Figure 13:
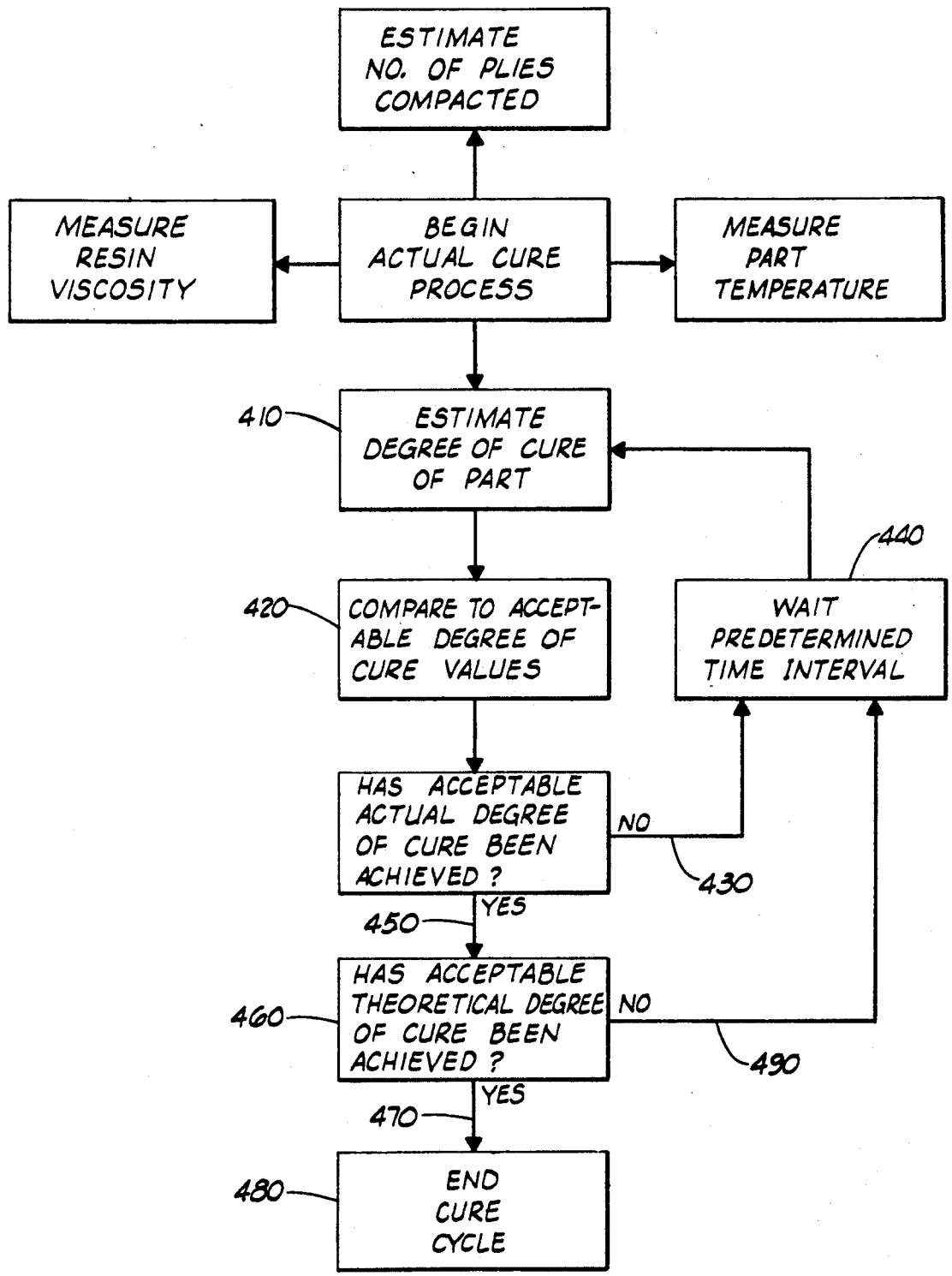
FIG. 13. Schematic representation of the process of comparing estimated degree of cure to the theoretical degree of cure in a preferred embodiment of the present invention.

The curing process of the part continues until the part has attained an acceptable level of cure. There are a number of ways to characterize the degree of cure of a composite part. In the preferred embodiment, degree of cure is estimated (Step 410, FIG. 13) by the degree of stiffness of the part. Stiffness is measured by the elastic modulus of the part. The elastic modulus is determined by ultrasonic velocity measurements taken for the part at predetermined time intervals during the curing process. The ultrasonic velocity measurements are outputted to the conversion means via transducers. Further details regarding the measurement of the elastic modulus in a composite part are described in U.S. Pat. No. 5,031,457 issued on Jul. 16, 1991 to R. Kline and in an article by R. Kline, et al., "Nondestructive Characterization of Elastic Anisotropy in Carbon-Composites," *Nondestructive Evaluation: NDE Planning and Application*, Symposium of the Am. Soc. of Mech. Engr. pp. 135–140 (1989), both of which are specifically incorporated herein by reference. In another embodiment, the degree of cure of the part may be estimated from measurements of the dielectric constant at various locations in the part during the curing process.

Once a value for the degree of cure of the part has been obtained, it is compared (Steps 420) to a value representing the acceptable actual degree of cure of the part. For example, the acceptable actual degree of cure may be 90% or 95% of the complete degree of cure, as estimated by the elastic modulus of a completely cured part.

If the minimum acceptable actual degree of cure has not been achieved (Step 430), the cure process continues and a predetermined time interval is allowed to elapse (Step 440) before the degree of cure is measured again (Step 410).

However, if the acceptable actual degree of cure has been obtained (Step 450), the next step in the process is to determine if the acceptable theoretical degree of cure has been attained (Step 460). The acceptable theoretical degree of cure is expressed as the fraction of the available heat (heat of reaction) within the part which has been released during the cure process. These values are obtained from the analytic models for cure kinetics which are run for the cure cycle during the cure cycle selection process (Step 120, FIG. 10). The amount of heat released (H) divided by the ultimate heat of reaction ($H_r$) represents the theoretical degree of cure $\alpha$, where the part is completely cured if $\alpha = 1$. Acceptable theoretical degree of cure then is some predetermined fraction of 1.0, for example, 0.90 or 0.95.

If this acceptable theoretical degree of cure has been reached (Step 470), the autoclave controls are instructed to end the cure cycle (Step 480). However, if the acceptable theoretical degree of cure has not been attained (Step 490), the cure process continues and a predetermined time interval is allowed to elapse (Step 440) before the degree of cure is measured again (Step 410).

Resin Viscosity

Figure 14:
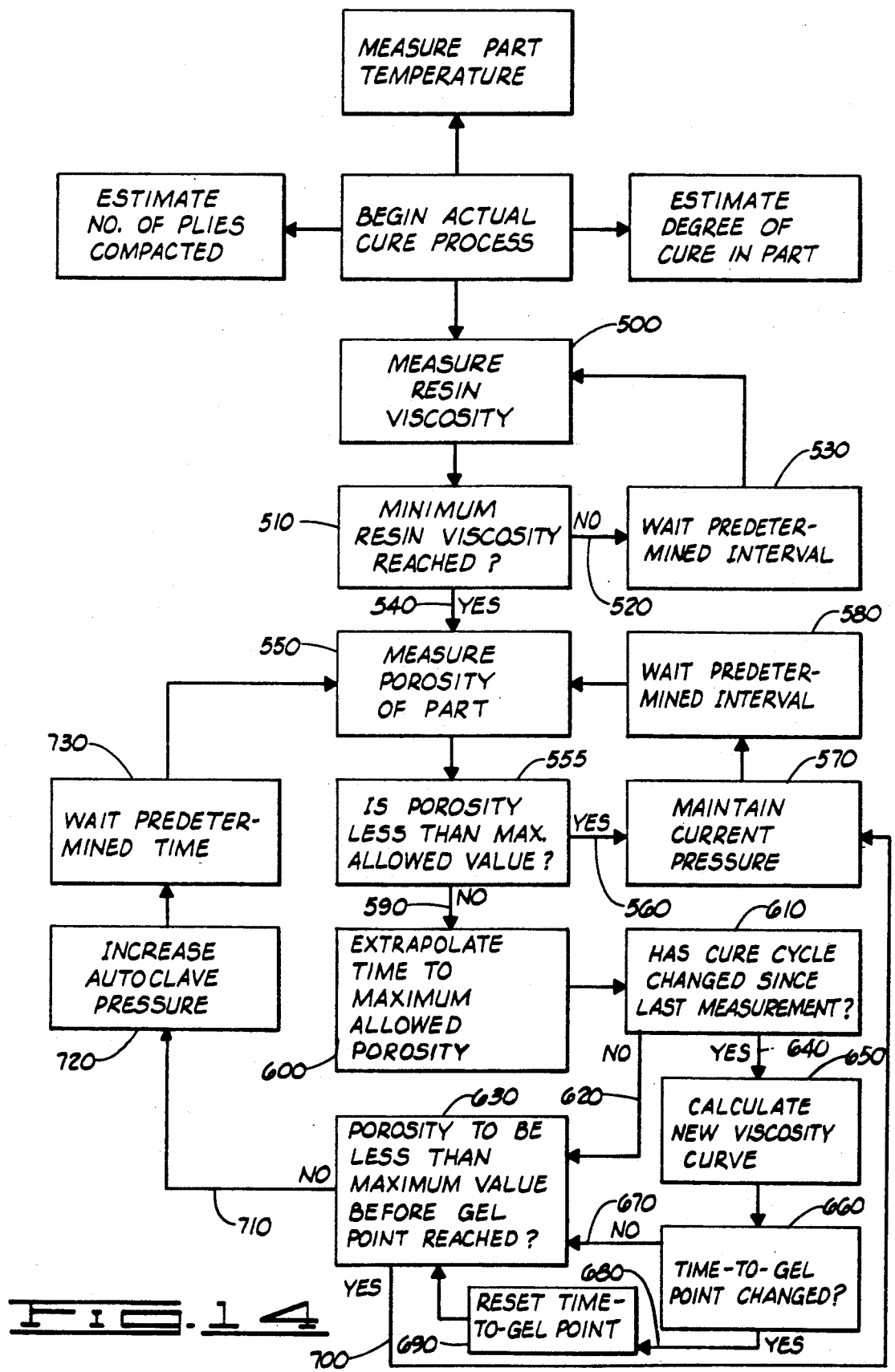
FIG. 14. Schematic representation of the process of measuring porosity and comparing it to gel point time in a preferred embodiment of the present invention.

The resin viscosity of the part determines the ability of the cure controller to manage the porosity of the resin within the part. As discussed earlier, the porosity of the part must be depressed below a maximum allowable porosity prior to the occurrence of gelling (the gel point) of the resin. Actual resin viscosity is measured with transducers using ultrasonic velocity measurements of the part during the curing process (Step 500, FIG. 14). Generation of ultrasonic signals and conversion of the transducer signals into parameters related to resin viscosity is described in articles by R. Kline, "Measurement of Attenuation and Dispersion Using an Ultrasonic Spectroscopy Technique," *J. Acoustic. Soc.*, Vol. 76(2), pp. 498–504 (1984) and by C. P. Hsiao and R. Kline, "The Measurement of Viscoelastic Moduli Using an Ultrasonic Spectroscopy Technique," 1984 *Ultrasonics Symposium*, pp. 4443–4446 (1984), which specifically are hereby incorporated herein by reference.

The value for the actual resin viscosity is compared (Step 510) to the resin viscosity curve previously computed from the analytic model for viscosity. The curve shows the lowest viscosity level that the resin will achieve (see FIG. 7). If measurements indicate that the minimum resin viscosity has not yet been reached (Step 520) during the cure process, a predetermined time interval is allowed to elapse (Step 530) before the next viscosity measurement is made (Step 500).

If the minimum viscosity has been reached (Step 540), the next step is to measure the porosity of resin in the part (Step 550). Porosity can be measured as described in U.S. Pat. No. 5,031,457 referred to and incorporated herein earlier. If the porosity of the resin has already been reduced below the maximum allowable value (for example, where $p_{max} = 1.0$ percent as indicated in FIG.

15) the autoclave controls are instructed to maintain the current ambient pressure within the autoclave (Step 570). After a predetermined interval (Step 580), the porosity of the part is measured again (Step 550) to determine if the porosity continues to remain below the predetermined maximum allowable level (Step 555).

If the porosity of the part is determined to be above the maximum allowable value the trend in change in porosity is evaluated (Step 590). Previous measurements of porosity (line segments A and B in FIG. 15) are extrapolated (Step 600), to determine at what time during the cure process the point of maximum allowable porosity would be reached. A determination is then made whether or not a different cure cycle had been selected since the last porosity measurement (Step 610).

Figure 15:
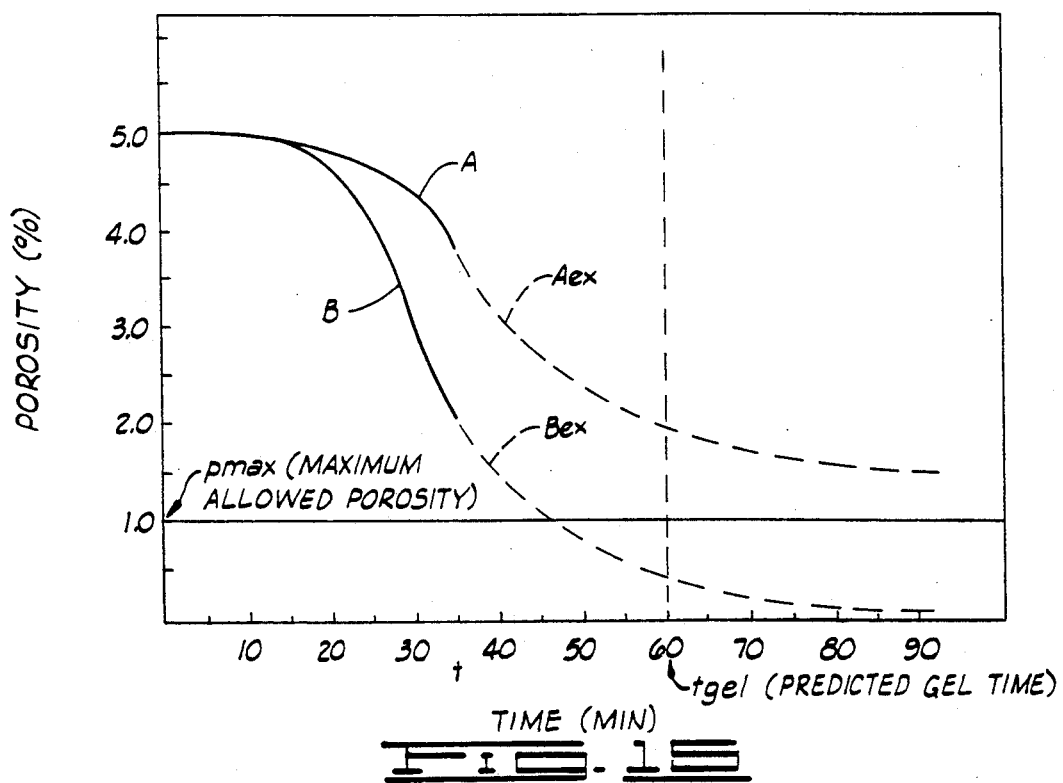
FIG. 15. Conceptual graph of the porosity extrapolation to gel point process of a preferred embodiment of the present invention.

If no change in cure cycle had been made (Step 620), a determination is made as to whether the extrapolation predicts that porosity will be less than the maximum allowable porosity value before the gel point (for example where $t_{gel}=60$ minutes; FIG. 15) is reached (Step 630). If the cure cycle has changed since the last porosity measurement (Step 640), a new resin viscosity curve is calculated for the new cure cycle (Step 650). The new resin viscosity curve is used to determine if the time until the gel point has changed (Step 660).

If the gel point time has not changed (Step 670), the comparison of the porosity extrapolation to the gel point time is made (Step 630). If the gel point time has changed (Step 680), this value is reset (Step 690) before the comparison of the porosity extrapolation to the gel point time is then made (Step 630).

If the extrapolation of the porosity measurements predicts, as shown by the dashed curve $B_{ex}$ in FIG. 15 for example, that the part porosity will be less than the maximum allowed porosity value before the gel point is reached (Step 700), the current ambient pressure is maintained in the autoclave (Step 570) and the porosity continues to be measured at predetermined intervals (Step 550).

If the extrapolation of the porosity measurements predict, as shown by the dashed curve $A_{ex}$ in FIG. 15, that the part porosity will still be greater than the maximum allowed porosity value by the time the gel point is reached (Step 710), the pressure within the autoclave is increased by a predetermined increment (Step 720). After a predetermined time interval has elapsed (Step 730), the steps of measuring part porosity and comparing the porosity to the maximum allowable value are repeated until the autoclave pressure has been increased sufficiently to reduce the porosity below the maximum allowed value.

Number of Compacted Plies

The final parameter which must be monitored during the cure cycle is the number of compacted plies. The predicted number of compacted plies is determined by running the analytic model for resin flow as indicated in (Step 170) of FIG. 10. The number of compacted plies is an important parameter because the quality of the composite part will be less than the achievable optimum if all plies within the part ar not compacted before the gel point occurs.

Figure 16:
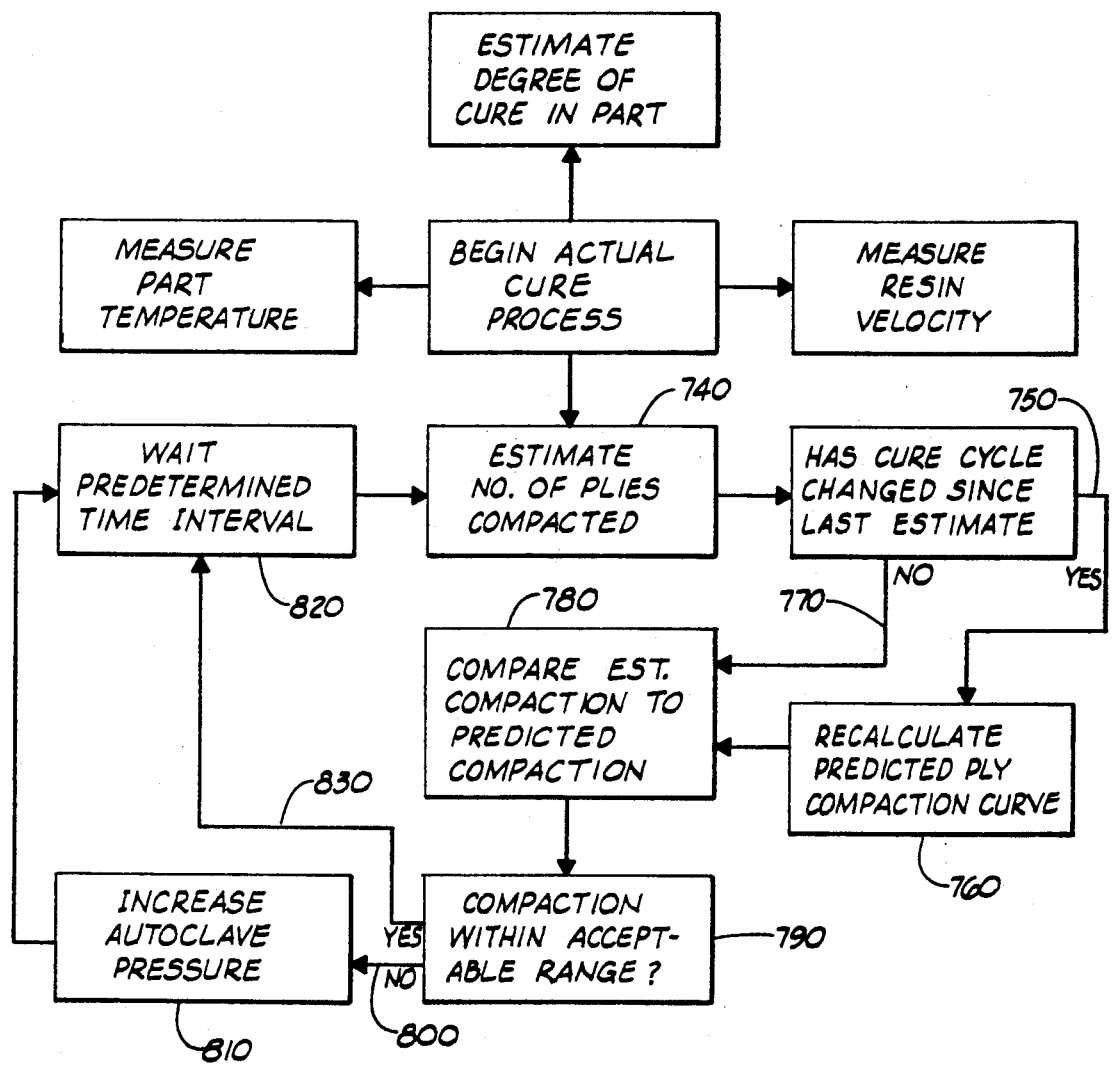
FIG. 16. Schematic representation of the process of comparing the theoretical number of compacted plies to the actual number of compacted plies in a preferred embodiment of the present invention.

The actual number of plies compacted at a given time is estimated (in Step 740 of FIG. 16). The actual number of compacted plies can be measured directly using ultrasonic velocity measurement. Alternatively in a preferred embodiment it can be estimated by correlation with measurements of the fiber volume fraction of the part. Fiber volume fraction is the percent of volume occupied by the fiber constituent of the composite part. The U.S. Pat. No. 5,031,457, referred to earlier and therein incorporated by reference describes the methodology for measuring fiber volume fraction. Fiber volume fraction is directly related to the total number of compacted plies in a part.

If the cure cycle has been replaced (Step 750) since the last compaction measurement, a new ply compaction prediction curve (such as previously shown in FIG. 8) is calculated by running the resin flow model for the new curve (Step 760). If the cure cycle has not changed since the last compaction measurement (Step 770), the current compaction curve is used.

The estimated number of compacted plies is then compared with the number of plies predicted to be compacted by that time (Step 780).

There is a predetermined minimum number of plies (for example, two less than the predicted number) that the actual number of compacted plies must attain (Step 790). If the actual number of compacted plies does not attain the acceptable predetermined minimum (Step 800), the autoclave pressure is increased by a predetermined increment (Step 810). A predetermined time interval is allowed to elapse (Step 820), then the number of compacted plies is estimated again (Step 740) and the process is repeated. If the number of compacted plies attains the acceptable minimum (Step 830), no change in pressure is made, and the process of monitoring the number of compacted plies is repeated for the duration of the curing process.

Changes may be made in the embodiments in the invention described herein or in parts of the elements of the embodiments described herein or in the steps or in the sequence of steps of the methods described herein without departing from the spirit and scope of the invention as defined in the following claims.

What is claimed is:

1. A method for controlling a curing process for curing a composite material part in a curing vessel, comprising the steps of:
   placing the composite material part in the curing vessel;
   selecting an initial cure cycle;
   beginning the curing process of the composite material part in accordance with the initial cure cycle;
   measuring an actual part temperature of the part during the curing process;
   measuring a pressure within the curing vessel during the curing process;
   directly measuring during the curing process at least one additional real part parameter value;
   comparing the additional real part parameter value to a predicted part parameter value determined from a predictive analytic model;
   selecting a new cure cycle periodically during the curing process when the additional real part parameter value falls outside of a predetermined acceptable range about the predicted part parameter value; and
   adjusting the curing process in accordance with the new cure cycle.

2. The method of claim 1 wherein the step of selecting a new cure cycle further comprises comparing the actual part temperature to a predicted maximum part temperature and selecting the new cure cycle when the actual part temperature falls outside of a predetermined acceptable range about the predicted maximum part temperature.

3. The method of claim 1 wherein in the step of selecting a new cure cycle, the real part parameter value further comprises a measured quantity related to actual degree of cure of the part and the predicted part parameter value further comprises a predicted degree of cure.

4. The method of claim 1 wherein in the step of selecting a new cure cycle, the real part parameter value further comprises a measured quantity related to actual viscosity of the part and the predicted part parameter value further comprises a predicted viscosity.

5. The method of claim 1 wherein in the step of selecting a new cure cycle, the real part parameter value further comprises a measured quantity related to the actual number of compacted plies and the predicted parameter part value further comprises a predicted number of compacted plies.

6. The method of claim 1 wherein the curing vessel is further defined as an autoclave.

7. A method for controlling a curing process for curing a composite material part in a curing vessel, comprising the steps of:
placing the composite material part in the curing vessel;
selecting an initial cure cycle;
beginning the curing process of the composite material part in accordance with the initial cure cycle;
measuring an actual part temperature of the part during the curing process;
measuring a pressure within the curing vessel during the curing process;
directly measuring during the curing process a measured quantity related to actual degree of cure of the part;
comparing the measured quantity related to actual degree of cure to a predicted degree of cure determined from a predictive analytic model;
selecting a new cure cycle periodically during the curing process when the measured quantity related to actual degree of cure falls outside of a predetermined acceptable range about the predicted degree of cure; and
adjusting the curing process in accordance with the new cure cycle.

8. The method of claim 7 wherein the step of selecting a new cure cycle further comprises comparing the actual part temperature to a predicted maximum part temperature and selecting the new cure cycle when the actual part temperature falls outside of a predetermined acceptable range about the predicted maximum part temperature.

9. A method for controlling a curing process for curing a composite material part in a curing vessel, comprising the steps of:
placing the composite material part in the curing vessel;
selecting an initial cure cycle;
beginning the curing process of the composite material part in accordance with the initial cure cycle;
measuring an actual part temperature of the part during the curing process;
measuring a pressure within the curing vessel during the curing process;
directly measuring during the curing process a measured quantity related to actual viscosity of the part;
comparing the measured quantity related to actual viscosity of the part to a predicted viscosity;
selecting a new cure cycle periodically during the curing process when the measured quantity related to actual viscosity falls outside of a predetermined acceptable range about the predicted viscosity; and
adjusting the curing process in accordance with the new cure cycle.

10. The method of claim 9 wherein the step of selecting a new cure cycle further comprises comparing the actual part temperature to a predicted maximum part temperature and selecting the new cure cycle when the actual part temperature falls outside of a predetermined acceptable range about the predicted maximum part temperature.

11. A method for controlling a curing process for curing a composite material part in a curing vessel, comprising the steps of:
placing the composite material part in the curing vessel;
selecting an initial cure cycle;
beginning the curing process of the composite material part in accordance with the initial cure cycle;
measuring an actual part temperature of the part during the curing process;
measuring a pressure within the curing vessel during the curing process;
directly measuring during the curing process a measured quantity related to actual number of compacted plies of the part;
comparing the measured quantity related to actual number of compacted plies of the part to a predicted number of compacted plies;
selecting a new cure cycle periodically during the curing process when the measured quantity related to actual number of compacted plies falls outside of a predetermined acceptable range about the predicted number of compacted plies; and
adjusting the curing process in accordance with the new cure cycle.

12. The method of claim 11 wherein the step of selecting a new cure cycle further comprises comparing the actual part temperature to a predicted maximum part temperature and selecting the new cure cycle when the actual part temperature falls outside of a predetermined acceptable range about the predicted maximum part temperature.

13. A method for controlling a curing process of a composite material part in a curing vessel, the part having at least one ply, the method comprising the steps of:
(a) providing an analytic model for calculating a predicted temperature of the part predicted to occur at a predetermined time during the curing process;
(b) measuring an actual maximum temperature of the part at the predetermined time during the curing process;
(c) comparing the predicted temperature to the actual maximum temperature;
(d) selecting a new cure cycle when the actual maximum temperature falls outside of an acceptable temperature range about the predicted temperature;
(e) adjusting an ambient temperature in the curing vessel in accordance with the new cure cycle;

(f) providing an analytic model for calculating a predicted resin viscosity of the part predicted to occur at a predetermined time during the curing process;

(g) calculating a predicted time-to-gel point for the part based on the predicted resin viscosity;

(h) measuring porosity of the part at the predetermined time during the curing process;

(i) predicting whether the porosity of the part will remain above a predetermined maximum acceptable level when the gel point is reached;

(j) increasing ambient pressure in the curing vessel by a predetermined increment when the porosity is predicted to remain above the predetermined maximum acceptable level when the gel point is reached;

(k) providing an analytic model for calculating a predicted number of compacted plies of the part predicted to occur at a predetermined time during the curing process;

(l) estimating an actual number of compacted plies of the part at the predetermined time during the curing process;

(m) comparing the predicted number of compacted plies to the actual number of compacted plies;

(n) adjusting the ambient pressure within the curing vessel by a predetermined increment when the actual number of compacted plies falls outside of a predetermined acceptable range;

(o) estimating an actual degree of cure of the part at a predetermined time during the curing process;

(p) comparing the actual degree of cure to a predetermined acceptable actual degree of cure;

(q) repeating steps a through p when the actual degree of cure falls below the acceptable actual degree of cure;

(r) providing, when the acceptable actual degree of cure has been achieved, an analytic model for determining when a predetermined acceptable theoretical degree of cure has been achieved; and (s) repeating steps o through r when the theoretical degree of cure is below the predetermined acceptable theoretical degree of cure.

14. The method of claim 13 wherein the composite material further comprises a graphite-epoxy laminate.

15. The method of claim 13 wherein the curing vessel is further defined as an autoclave.

16. A method for curing a composite material part in a curing vessel, comprising the steps of:

(a) obtaining initial property values for the composite material comprising the part wherein the part contains at least one ply;

(b) specifying an initial part temperature;

(c) determining an initial set of cure cycles;

(d) running a computer model simulation of each cure cycle in the initial set to predict the length of time which would be required for the cure cycle to satisfy a set of conditions wherein the set of conditions includes:

achieving a predetermined minimum acceptable degree of cure of the part;

compaction of all the plies of the part; and maintenance of the maximum internal part temperature below a predetermined maximum value during the curing process;

(e) selecting, as an initial cure cycle, the cure cycle in the initial set of cure cycles which satisfied the set of conditions in the shortest time;

(f) disposing the composite material part within the curing vessel for curing;

(g) setting initial curing vessel process conditions at the temperature and pressure levels dictated by the initial cure cycle;

(h) beginning the curing process;

(i) monitoring ambient levels of temperature and pressure within the curing vessel and adjusting the ambient levels as needed in accordance with the initial cure cycle;

(j) obtaining, at a predetermined time interval, real parameter values wherein the real parameters comprise:

maximum temperature of the part;

degree of cure of the part;

resin viscosity of the part;

porosity of the part; and the number of compacted plies of the part;

(k) comparing the real parameter values for temperature, degree of cure, resin viscosity, porosity and number of compacted plies to predicted parameter values for temperature, degree of cure, resin viscosity, porosity and number of compacted plies predicted by the computer simulations of the initial cure cycle;

(l) selecting a new cure cycle when at least one of the real parameter values falls outside of predetermined acceptable ranges of the predicted parameter values predicted by the initial cure cycle wherein the new cure cycle is selected by following steps c, d and e;

(m) adjusting the curing vessel process conditions in accordance with the conditions dictated by the new cure cycle when a new cycle is selected; and (n) continuing to monitor the curing process of the part by repeating steps i through m until the composite part has achieved the predetermined acceptable degree of cure wherein the cure process is ended.

17. The method of claim 16 wherein the composite material further comprises a graphite-epoxy laminated material.

18. The method of claim 16 wherein the curing vessel is further defined as an autoclave.

* * * * *

UNITED STATES PATENT AND TRADEMARK OFFICE
CERTIFICATE OF CORRECTION

PATENT NO. : 5,207,956

DATED : May 4, 1993

INVENTOR(S) : Kline, et al

It is certified that error appears in the above-indentified patent and that said Letters Patent is hereby corrected as shown below:

Column 1, Line 41; after trials, please insert a period, i.e., --.--.

Column 2, Line 49; after limited, please delete "mean" and substitute therefore --means--.

Column 4, Line 48; after for, please delete "during" and subsittute therefore --curing--.

Column 5, Line 21; after the, please delete "10".

Col. 6, Line 40; after 50, please insert --and-- and after 55, please insert --,--.

Column 6, Line 49; after signals, please delete "ma" and substitute therefore --may--.

Column 7, Line 19; after material, please delete "ar" and substitute therefore --are--.

Column 12, Line 39; after percentage, please delete "much" and substitute therefore --such--.

Column 13, Line 5; after from time, please delete "to" and substitute therefore --$t_o$--.

UNITED STATES PATENT AND TRADEMARK OFFICE
CERTIFICATE OF CORRECTION

PATENT NO. : 5,207,956
DATED : May 4, 1993
INVENTOR(S) : Kline, et al

It is certified that error appears in the above-indentified patent and that said Letters Patent is hereby corrected as shown below:

Column 15, Line 41; after measurements, please delete "predict" and substitute therefore --predicts--.

Column 15, Line 66; after Alternately, please insert --,--.

Signed and Sealed this

Thirty-first Day of May, 1994

*Attest:*

BRUCE LEHMAN

*Attesting Officer*     *Commissioner of Patents and Trademarks*